Patented Dec. 2, 1947

2,431,921

UNITED STATES PATENT OFFICE 2,431,921

BENZOYL PEROXIDE TREATMENT OF REACTION PRODUCTS OF DIISOCYANATES WITH LINEAR POLYESTERS

James Gordon Cook, Manchester, and Raymond Charles Seymour, Birmingham, England, assignors to Imperial Chemical Industries Limited, a corporation of Great Britain No Drawing. Application January 30, 1945, Serial No. 575,348

In Great Britain January 28, 1944

1 Claim. (Cl. 260—75)

This invention relates to the curing of polymeric materials more especially to the curing of organic diisocyanate modified polyesters or polyesteramides.

In application numbered 13,204/41 (U. S. Serial No. 466,356, filed Nov. 20, 1942) it has been proposed to cure organic diisocyanate modified polyesters or polyester-amides by heating these in the presence of formaldehyde or of a formaldehyde-liberating substance, and preferably, also in the presence of materials which function as curing catalysts, for example, formic, glycollic, oxalic, succinic, maleic, adipic, tartaric, salicylic, anthranilic, phthalic, citric, boric and phosphoric acids, phthalic and maleic anhydrides, phthalimide and potassium or sodium dihydrogen phosphate.

In application numbered 17,359/42 (U. S. Serial No. 522,800, filed Feb. 17, 1944) it has been proposed to vulcanise organic diisocyanate-modified unsaturated polyesters or polyester-amides, that is to say, those derived from polyamide- and/or polyester-forming ingredients at least one of which contains an unsaturated linkage of the non-benzenoid type, by heating them with sulphur in presence of an accelerator.

We have now found that, in the curing of organic diisocyanate-modified polyesters or polyester-amides, which may be unsaturated or not, substances (other than sulphur) which are known to cure rubber, may be used as the curing agents.

According to the present invention we provide a process for curing organic diisocyanate-modified polyesters or polyester-amides, unsaturated or not, which comprises using as a curing agent, a nitro-compound or a peroxide or a quinone oxime.

Suitable nitro-compounds include dinitrobenzene and trinitrobenzene; suitable peroxides include benzoyl peroxide; and suitable quinone oximes include quinone-dioxime.

The amounts of the curing agents usually vary from 1.0 to 5.0 parts per 100 parts by weight of polymeric material, but greater or smaller amounts may be used if desired.

As well as the ingredients already mentioned one or more additional ingredients may also be used. These include fillers, for example, iron oxide, clay, asbestos, blanc fixe and mica; other plastic materials, for example, synthetic rubbers, vulcanised vegetable oils, dark substitute, white substitute, wood rosin and pitch; detackifying agents, for example, stearic acid, paraffin wax, oleic acid and lauric acid; plasticisers, for example, tricresyl phosphate, dibutyl phthalate, butylphthalyl butyl glycollate and N-alkyl-toluene-sulphonamides; stabilisers or anti-oxidants, for example, hydroquinone, N:N'-hexamethylene-bis-o-hydroxybenzamide, N-phenyl-$\alpha$-naphthylamine, N-phenyl-$\beta$-naphthylamine and $\alpha$:$\alpha$-bis(2-hydroxy-3:5-dimethylphenyl)butane. Small quantities of pigments, for example from 1–3% by weight, such as are customarily used in rubber technology, may also be used to impart colour. Carbon black or other oxygen-absorbing ingredients should not be used.

In carrying the invention into practical effect the several ingredients are compounded together, conveniently on a rubber mill, at a temperature usually below about 70–90° C., if desired in the presence of an organic solvent or swelling agent.

Curing is usually effected by heating at about 100–150° C. for periods of time varying from a few minutes to several hours. The mix may be formed into shapes or spread or calendered on to a substrate, for example, on to the surface of a fabric, and heated in a press or mould or in hot air. If desired, to facilitate the shaping or spreading, organic solvents or swelling agents may be incorporated with the mix; these are removed prior to or during the curing.

A variety of articles may be constructed from the cured materials obtained in accordance with this invention. In the construction of these articles the materials may be supported on a substrate and/or interspersed with a filler. For instance, the materials may be used in the construction of petrol-and/or oil-resistant articles of all kinds, for example gaskets, packings, hose, diaphragms for pumps and the like, as well as in the fabrication of flexible containers. They may also be used in the manufacture of rollers, blankets and stereos for use in the printing industry, or to provide protective sheathings for insulated electric cables. They also find application in the construction of balls for games, tires, elastic threads, conveyor or transmission belting, engine bearings, coated fabrics, including protective clothing and floor coverings, and generally in the construction of articles requiring the use of a material having physical properties resembling those of rubber, but also having a good resistance to the action of organic fluids and a low permeability to gases and vapours.

Polyester- and polyamide-forming reactants which contain no unsaturated linkages of the non-benzenoid type and which are suitable for making the polyesters or polyester-amides include glycols, for example, ethylene glycol, diethylene glycol, trimethylene glycol, pentamethylene glycol, hexamethylene glycol, dodecamethylene glycol, 1:12-octadecanediol and pentaglycol; aliphatic or aromatic aminoalcohols having at least one hydrogen atom attached to the amino nitrogen atom and preferably containing an aliphatic chain of at least two carbon atoms separating the amino and hydroxyl groups, for example β-ethanolamine and 3-aminopropanol; dibasic carboxylic acids or ester-forming derivatives thereof, preferably aliphatic dicarboxylic acids, for example, malonic, succinic, glutaric, adipic, β-methyladipic, pimelic, suberic, azelaic, sebacic, undecanedioic, brassylic, iso-phthalic, hexahydroterephthalic, p-phenylenediacetic, and acetone-dicarboxylic acids; primary and secondary diamines, for example, ethylene diamine, hexamethylene-diamine 3-methylhexamethylene diamine, decamethylenediamine, m-phenylenediamine, N : N' - dimethylhexamethylenediamine, N:N'-diethylhexamethylenediamine and N:N'-dimethyldecamethylenediamine; monohydroxy-monocarboxylic acids or their ester-forming derivatives, for example, glycollic, 6-hydroxycaproic, 10-hydroxydecanoic and 12-hydroxystearic acids; and polymerizable monoaminomonocarboxylic acids, or their ester-forming derivatives, for example, 6-aminocaproic acid or its lactam, caprolactam, and 9-aminononanoic, 11-aminoundecanoic and 12-aminostearic acids.

Polyester- and polyamide-forming reactants which contain unsaturated linkages of the non-benzenoid type which may be used in conjunction with the saturated ingredients mentioned above, include unsaturated dibasic carboxylic acids, or their ester-forming derivatives, for example, maleic, fumaric and dihydromuconic acids, acetylene dicarboxylic acid and itaconic acid; unsaturated aliphatic diamines, for example, 1:4-diaminobutene; unsaturated glycols, for example, 1:4-butene diol. Suitable proportions of the reactants containing the unsaturated linkages are from 5 to 25 parts per 100 parts by weight of the total reactants.

The polyesters or polyester-amides which are low molecular weight materials, are made by heating the selected reactants at polymerizing temperatures, usually in the absence of air or oxygen, under conditions whereby water is removed from the reaction mixture. When a diamine is to be used, it is conveniently used in the form of the corresponding diammonium salt from some of the dibasic carboxylic acid to be used. In the main, under these conditions, linear polymers are formed by condensation polymerisation, but due to the presence of reactants containing unsaturated linkages non-linear or cross-linked polymers may also be formed by addition polymerization. If there is much cross-linking, the products gel; this can usually be obviated by including with the reactants a small proportion of a polymerization inhibitor such as hydroquinone, copper powder or copper rosinate. It will be understood that the proportions of the reactants are so chosen that there are present approximately chemically equivalent proportions of their complementary ester-forming groups and also of their complementary amide-forming groups, if amide forming reactants are used.

The low molecular weight polyesters or polyester-amides are converted into the high molecular weight polymers, that is to say the organic diisocyanate-modified unsaturated polyesters or polyester-amides, by mixing them, for example by stirring, milling or kneading with the organic diisocyanate and then heating the mixture, for example, to a temperature of 100-200° C. for a period of 10-720 minutes. Up to about 10 per cent, usually 3-7, by weight of the diisocyanate is used, that is to say, sufficient diisocyanate to give a polymer of suitable physical properties for subsequent processing on a rubber mill. If the low molecular weight polymer is appreciably cross-linked, then a smaller proportion of diisocyanate is required, usually about 1-2%.

Examples of organic diisocyanates include ethylene diisocyanate, trimethylene diisocyanate, tetramethylene diisocyanate, hexamethylene diisocyanate, decamethylene diisocyanate, m-phenylene diisocyanate, p:p'-diphenyl diisocyanate and naphthalene diisocyanates.

The invention is illustrated but not limited by the following examples, in which the parts are expressed by weight, unless otherwise stated:

*Example 1*

100 parts of an organic diisocyanate-modified unsaturated polyester, 1 part of stearic acid, 40 parts of ferric oxide and 2 parts of benzoyl peroxide are milled together on a two-roll rubber mill at a temperature of 50-60° C. until the ingredients are thoroughly mixed. The mixture is removed from the mill and heated in a suitable mould under hydraulic pressure at 141° C. for 60 minutes. The cured material is not thermoplastic and has a high resilience and low permanent set.

Some of its physical properties are as follows:

Shore Hardness at 20° C _____ 65
B. S. I. Hardness at 20° C _____ 60
Resilience at 25° C _____ per cent__ 58.4
Resilence at 50° C _____ do____ 65.8
Swelling in benzene (two days at 20° C.) _____ per cent by volume__ 91

The uncured material disintegrates when immersed in benzene-ethanol mixtures; it is thermoplastic and has a high permanent set and low resilience.

The organic diisocyanate-modified unsaturated polyester used in this example is that obtained in the manner described in Example 1 of application numbered 17359/42.

The organic diisocyanate-modified unsaturated polyester used in this example is prepared as follows: 1,917 parts of adipic acid, 441 parts of maleic anhydride and 1,126 parts of ethylene glycol are heated together under nitrogen up to 190° C. during nine hours, and the mixture is then subjected to continuous azeotropic distillation with xylene at 185° to 190° for thirty-six hours. The xylene is then removed. The product is a pale yellow syrup of acid value 16.6 mgm. potassium hydroxide per gram. 1,000 parts of this syrup are heated to 70° C. in an internal mixer of the Baker-Perkins type. 55 parts of hexamethylene diisocyanate are added and the mixture is stirred for five minutes. The stirred mix is poured, to give layers one inch thick, into metal trays two inches deep, which have previously been coated on the inside with the high melting grease obtained by dissolving 15 parts of aluminum stearate in 25 parts of lubricating oil. The trays and contents are then heated in an oven at 100° C. for twelve hours, after which time they are taken out, cooled, and the polymeric material is removed. It is a soft, pale yellow, rubber-like material which does not harden on standing.

*Example 2*

100 parts of the unsaturated organic diisocyanate modified polyester used in Example 1 are mixed in similar fashion with the same ingredients, but using 10 parts of ferric oxide instead of 40 parts. After curing as before for 60 minutes at 141° C., some of the physical properties of the cured materials are as follows:

| | |
|---|---|
| Shore hardness at 20° C | 62 |
| B. S. I. hardness at 20° C | 60 |
| Resilience at 25° C percent | 69.1 |
| Resilience at 50° C do | 76.1 |
| Swelling in benzene (two days at 20° C.) per cent by volume | 46 |

Similar results are obtained by using quinone dioxime or dinitrobenzene instead of benzoyl peroxide.

Similar results are obtained by using organic diisocyanate modified polyester-amides in place of the organic diisocyanate modified polyester.

We claim:

In the process of curing a diisocyanate-modified polymeric product obtained by reacting 1 to 10% of a hydrocarbon diisocyanate with a polymer derived by polymerization from a reaction mass comprising bifunctional carboxylic ester-forming reactants at least one of said reactants containing an unsaturated linkage of the non-benzenoid carbon-to-carbon type and constituting from 5 to 25 parts by weight per 100 parts by weight of the polymer-forming reactants, the step which comprises forming a mixture of benzoyl peroxide and said diisocyanate-modified polymeric product and heating said mixture at 100° C. to 150° C. to effect curing, said mixture containing 1.0 to 5.0 parts of benzoyl peroxide per 100 parts by weight of said diisocyanate-modified polymeric product.

JAMES GORDON COOK.
RAYMOND CHARLES SEYMOUR.

REFERENCES CITED

The following references are of record in the file of this patent:

UNITED STATES PATENTS

| Number | Name | Date |
|---|---|---|
| 2,282,827 | Rothrock | May 12, 1942 |
| 2,195,362 | Ellis | Mar. 26, 1940 |
| 2,388,319 | Fuller | Nov. 6, 1945 |